Feb. 16, 1937. W. E. CLAUS 2,070,884
DRAFT COUPLING
Filed July 27, 1935 2 Sheets-Sheet 1
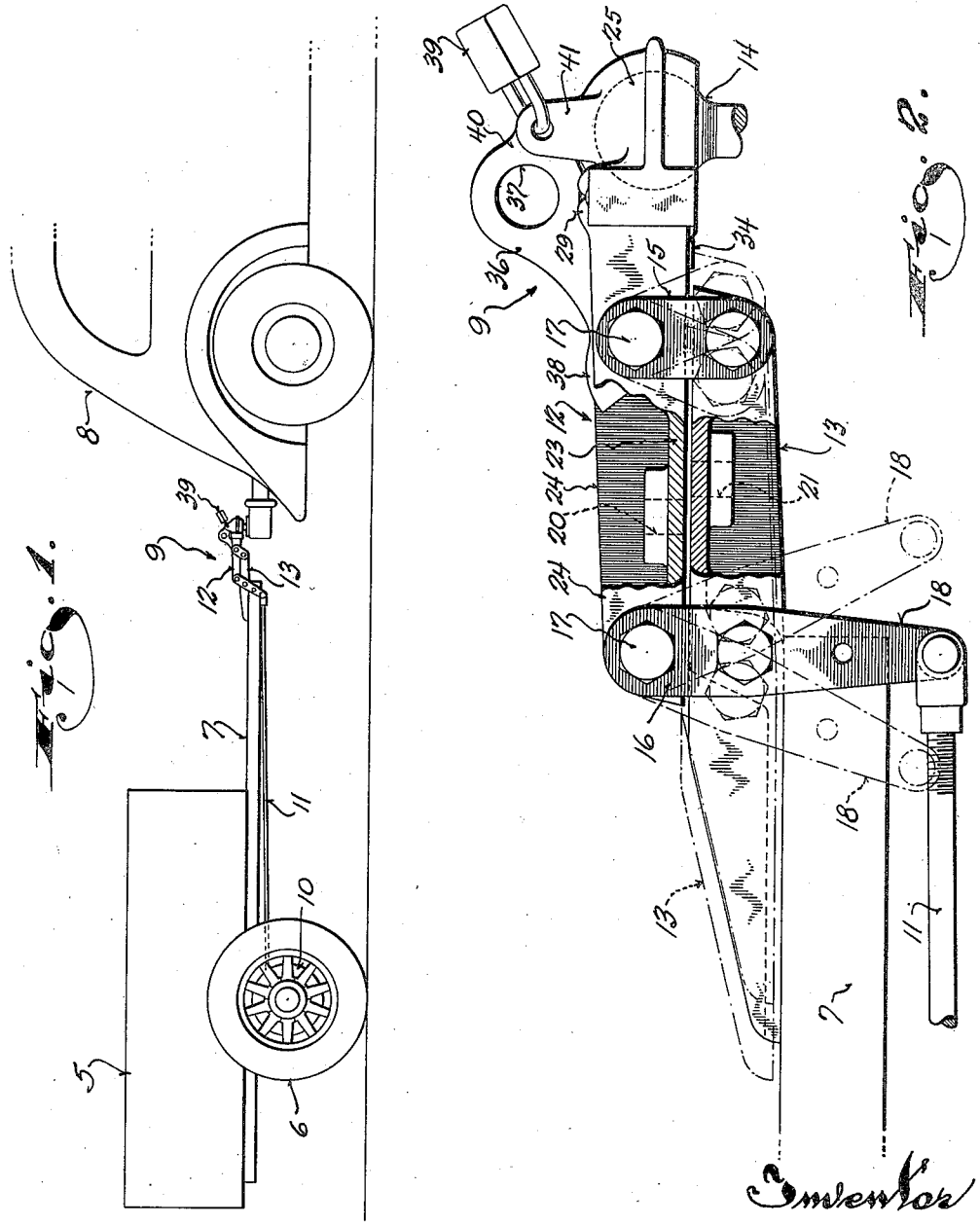
Inventor
Walter E. Claus Feb. 16, 1937.  W. E. CLAUS  2,070,884
DRAFT COUPLING
Filed July 27, 1935   2 Sheets-Sheet 2
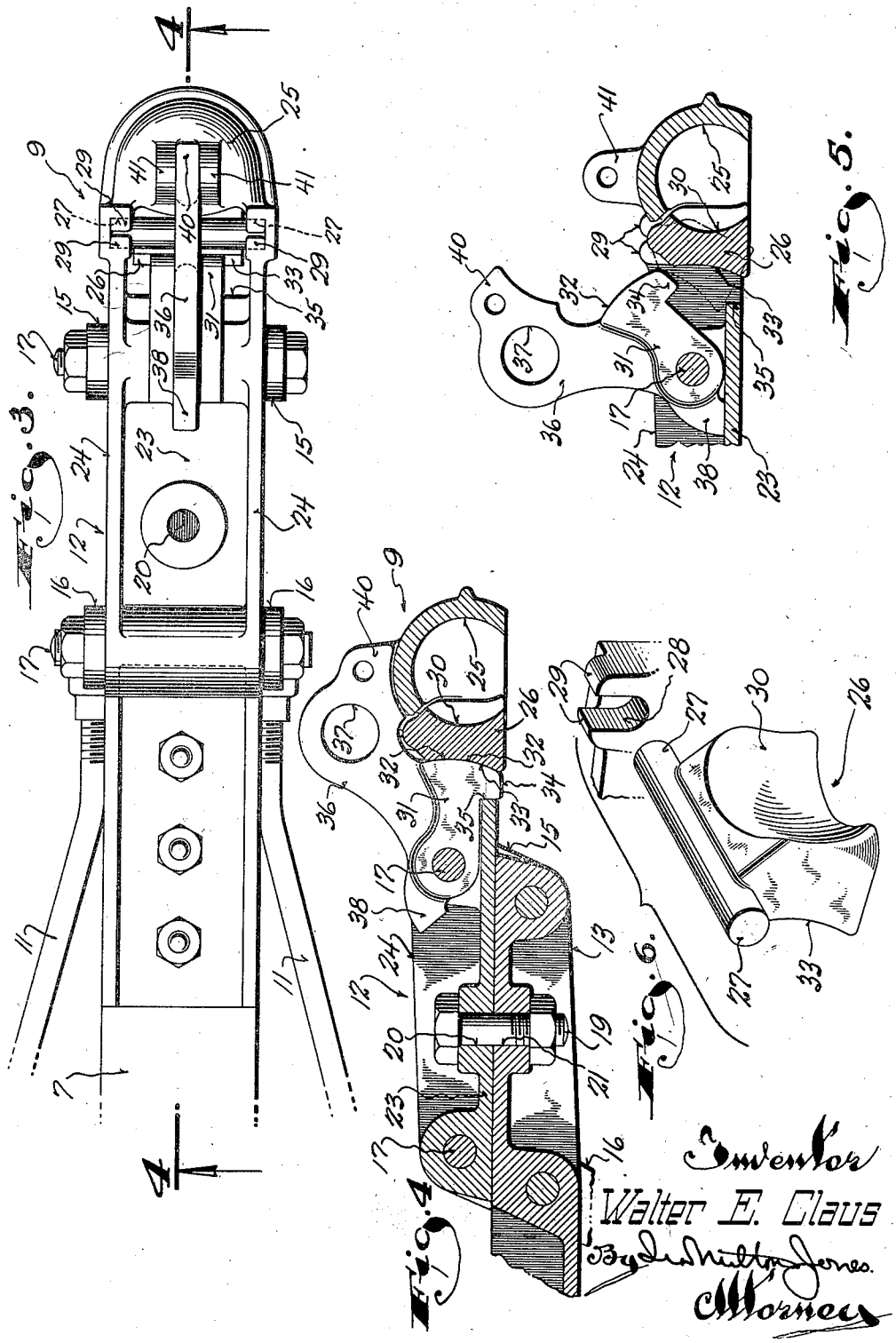
Inventor
Walter E. Claus Patented Feb. 16, 1937

2,070,884

UNITED STATES PATENT OFFICE 2,070,884

DRAFT COUPLING

Walter E. Claus, Milwaukee, Wis., assignor to Sportsman's Equipment Co., Milwaukee, Wis., a corporation of Wisconsin Application July 27, 1935, Serial No. 33,433

7 Claims. (Cl. 280—33.15)

This invention relates to draft couplings and refers particularly to trailer hitches for attaching a trailer to an automobile or other draft vehicle.

Since trailers have come into popular use for touring and the hauling of light loads, many makeshift hitch arrangements have been employed, the majority of which present serious hazards because of their insecurity.

Hence, this invention contemplates as one of its objects to provide a trailer hitch which cannot become accidentally detached.

Another serious disadvantage of past and existing trailer hitches is the fact that they require considerable work in attaching and detaching the trailer. Generally, bolts or cotter pins have to be removed which often require the use of tools.

It is, therefore, another object of this invention to provide a trailer hitch which is easily and quickly attached or detached, entirely without the use of tools.

Another object of this invention is to provide a trailer hitch which can be locked against unauthorized detachment so as to preclude the possibility of theft of the entire trailer.

In the use of trailers, particularly the house or cabin type employed in touring, the additional load which the trailer imposes upon the braking equipment of the automobile often exceeds the capacity of the brakes and subjects them to tremendous wear. To overcome this difficulty, the present invention contemplates the provision of novel means, forming an inherent part of the draw-bar mechanism, for automatically applying a set of brakes with which the trailer is equipped.

In this connection it is a further object of this invention to provide a combined hitch and brake applying mechanism for trailers which incorporates relatively movable parts adapted to produce motion upon a forward surge of the trailer which motion is utilized for the application of brakes with which the trailer is equipped.

Still another object of this invention is to provide simple means for rendering the brake applying mechanism ineffective.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

Figure 1 is a side view of a trailer and the rear portion of an automobile showing the manner in which this invention is employed;

Figure 2 is an enlarged side view of the combined hitch and brake applying mechanism, parts thereof being broken away and in section;

Figure 3 is a top view of the combined hitch and brake applying mechanism;

Figure 4 is a longitudinal section view through Figure 3 on the plane of the line 4—4;

Figure 5 is a partial section view similar to Figure 4 but showing the hitch in its open position; and Figure 6 is a perspective view showing a detail of construction of the hitch.

Referring now more particularly to the accompanying drawings in which like numerals indicate like parts throughout the several views, the numeral 5 designates a trailer equipped with wheels 6 and a draw-bar 7. The draw-bar 7 is adapted to be attached to the rear of an automobile or other draft vehicle, indicated by the numeral 8, through the medium of the combined hitch and brake applying mechanism of this invention, indicated generally by the numeral 9. The trailer wheels 6 are equipped with brakes 10 adapted to be applied upon the exertion of a pull on brake rods 11 which extend forwardly along the draw-bar 7 to be connected to the brake applying mechanism 9.

The combined hitch and brake applying mechanism comprises two superimposed members 12 and 13 which in the present instance are formed as castings. The member 12 is adapted to be attached to a ball part 14 fixed to the automobile in any suitable manner and the member 13 is bolted to the draw-bar 7. The members 12 and 13 are relatively movably connected by links 15 and 16 in such a manner that the composite structure forms a parallelogram. There are preferably two links 15 and two links 16, one of each pair mounted on each side of the two members 12 and 13, with the pivotal connections between the links and the members 12 and 13 provided by cross bolts 17, passing through aligned holes in the links and suitable bosses cast as integral parts of the members 12 and 13.

The parallelogram arrangement of the connected members 12 and 13 permits relative endwise movement of the members in the direction of pull, and when a pulling force is being applied, the parts take the positions shown in Figures 1 and 4. In these positions the members 12 and 13 are in flat engagement to form substantially one integral unit so that the pull is imparted from the automobile directly to the draw-bar of the trailer. Upon deceleration of the automobile and the consequent forward surge of the trailer, the member 13 moves forwardly with respect to the member 12 causing the lower ends of the links 15 and 16 to swing forwardly.

The links 16 have extensions 18 on their lower ends which swing through a considerable arc as the member 13 moves forwardly in response to the forward surge of the trailer. These link extensions 18 have the brake rods 11 attached thereto so that the forward swinging movement of the links imparts a pull on the rods to apply the brakes 10 of the trailer. The adjustment of the brakes is such that their application begins when the links are in approximately vertical position so that any forward surge of the trailer is effectually checked before the load thereof is imposed upon the automobile braking equipment.

If it is desired to render the brake applying mechanism ineffective, it is only necessary to slip a bolt 19 through holes 20 and 21 formed through the members 12 and 13, respectively, and which are in alignment when the members 12 and 13 are in the positions which they assume during the application of the pull on the draw-bar.

The novel hitch arrangement by which the member 12 is attached to the ball part 14 will now be described.

The member 12, which as stated hereinbefore is preferably a malleable iron casting, has a base 23 and upwardly extending flanges 24 at the sides thereof so that it is channel-shaped in cross section. At its forward end, the base 23 is cut away to provide an opening entirely through the member 12 and the extreme adjacent portions of the side flanges 24 are connected and shaped to partially form a socket 25 open at its bottom and at its rear to permit insertion and removal of the ball member 14.

The opening at the rear is adapted to be closed by a gate 26, hingedly mounted between the flanges 24 by trunnions 27 formed as integral parts of the gate and seated in recesses 28 formed in the side flanges 24. The sides of the recesses 28 have upwardly projecting tongues or ears 29 which are struck down over the trunnions 27, after assembly, to hold the gate assembled with the member 12.

The forward wall 30 of the gate is spherical and when the gate is in its operative position to which it swings by gravity, this forward wall 30 forms a continuation of the socket wall 25 and completes the socket to prevent detachment or disengagement of the ball therefrom. To permit engagement and disengagement of the ball and socket, it is only necessary to allow the gate 26 to swing rearwardly which opens the socket wide enough to permit passage of the ball.

Rearward swinging of the gate 26 is, however, prevented by a latch 31 disposed between the side flanges 24 and pivotally mounted thereon by the cross bolt 17 which attaches the links 15 to the member 12. The latch 31 has its forward wall 32 formed on an arc radial to the axis of the pivotal mounting 17, and the rear wall 33 of the gate which is engageable by the front wall of the latch is likewise formed on an arc radial to the axis of the pivot 17. This arcuate formation of the contacting walls 32 and 33 permits free movement of the latch to and from operative position holding the gate in its socket closing position.

It is to be observed that the latch 31 has a downwardly projecting lug 34 which engages the forward edge 35 of the base 23 when the latch is in its operative position. Hence, any rearward force applied to the gate 26 will be transmitted through the lug 34 directly to the member 12 without imposing stress on the pivot bolt 17. It is also to be noted that the center of the ball and socket connection lies beneath the center of the bolt 17 so that any rearward force applied to the gate 26 will tend to turn the latch in a clockwise direction and thus preclude a tendency of the latch to release.

Accidental lifting of the latch 31 to its position freeing the gate for rearward movement is further precluded by virtue of the fact that the mass of its weight lies forwardly of the pivot 17.

To facilitate disengagement of the latch, a fin or rib 36 extends upwardly therefrom and has a finger engaging loop 37 formed in the upper portion thereof. Hence, merely lifting on the loop 37 releases the latch 31, freeing the gate 26 for rearward movement and disengages the socket from the ball 14. To limit the counter-clockwise movement of the latch incidental to the application of lifting force thereon, a toe 38 is cast onto the rear portion of the latch to engage the top of the base 23 when the latch has been lifted a distance sufficient to permit the gate 26 to swing to its open position.

Unauthorized disengagement of the ball and socket connection and consequent detachment of the trailer from the automobile, may be precluded by applying the shackle of a padlock 39 through aligned holes in a forward extension 40 on the fin or rib 36 of the latch and two upstanding ears 41 projecting up from the socket head.

From the foregoing description taken in connection with the accompanying drawings, it will be readily apparent to those skilled in the art, that this invention provides a novel hitch and brake applying mechanism for trailers and that accidental detachment of the hitch is an impossibility except through breakage of the parts. It will also be apparent that the composite elements of the mechanism are of simple, rugged construction, not easily broken and inexpensive to manufacture.

What I claim as my invention is:

1. In a trailer hitch, a member having a partially formed socket to receive a ball and having a solid transverse wall spaced from the partially formed socket, a part movably connected with said member between said partially formed socket and the solid transverse wall and adapted to complete the socket, said part being movable to and from a position enabling engagement and disengagement of the ball and socket, and a latch having a part positionable between the solid transverse wall and the movable part for releasably holding said part against movement to its position enabling engagement and disengagement of the ball and socket.

2. In a hitch of the character described, a member having a portion shaped to provide part of the socket of a ball and socket joint, a gate hingedly mounted on said member to swing to and from a position at which one wall of the gate completes the socket and prevents disengagement of a ball therefrom, a latch pivotally mounted on said member to move through the top of said member and to swing by gravity to a position engaging the surface of the gate opposite that which completes the socket so as to hold the gate in its socket completing position, and the axis of pivotal mounting of the latch being above the center of the ball and socket joint so that force applied from the ball onto the gate tends to force the latch into its operative position.

3. In a hitch of the character described, a member having a base and upstanding flanges at the sides thereof, said flanges extending beyond one end of the base, a socket forming head joining the adjacent ends of the side flanges and partially forming a socket adapted to receive a ball, a gate extending across the space between the side flanges adjacent the socket forming head, means for hingedly mounting the gate on said side flanges for swinging movement to and from a position at which one wall thereof completes the socket, a latch hingedly mounted on said member and adapted to swing down into a position holding the gate in its closed socket completing position, and a lug on the latch positionable directly between the gate and a solid wall of the base to relieve the hinged mounting of the latch from strain incidental to a force tending to push the ball toward said member.

4. In a hitch of the character described, a member having a base and being substantially channel-shaped in cross section with its side flanges projecting beyond one end of its base, a socket forming head joining said ends of the side flanges and partially forming a socket adapted to receive a ball, a gate disposed between the side flanges adjacent the socket forming head, means hingedly mounting the gate from said side flanges for swinging movement to and from a position at which one wall thereof completes the socket, and a latch movably mounted on said member and having a part positionable between the gate and said end of the base of said member to firmly hold the gate in its closed socket completing position and relieve the mounting of the latch from strain incidental to a force tending to push the ball toward said member.

5. In a hitch of the character described, a member having a base with spaced upstanding flanges extending beyond one end of the base, a socketed head joining the flanges outwardly of said end of the base, said socketed head being open at its bottom and inner portion which faces said end of the base so as to be engageable onto a ball member, a gate pivoted at its upper end from the spaced flanges to hang by gravity in a position with one wall substantially closing the open inner portion of the socketed head, and a latch pivotally mounted from the spaced flanges to swing to and from a position with a part thereof confined between the gate and said end of the base to hold the gate in its closed socket completing position without imposing strain on the pivoted mounting of the latch.

6. In a hitch of the character described, a member having a base with spaced upstanding flanges projecting beyond one end of the base, a socketed head joining the flanges outwardly of said end of the base so as to leave a space between the head and said end of the base, the socket of the head being open at its bottom and its inner portion which faces said end of the base so as to be engageable onto a ball member, a gate having one wall shaped to complete the socket, trunnions on the gate received in open topped recesses in the flanges to pivotally mount the gate for movement to and from closed position completing the socket, and ears bent in from the sides of the recesses over the trunnions to hold the same in place.

7. In a trailer hitch, a member having a partially complete ball socket and having a solid transverse wall spaced from the partially complete socket, a gate pivotally mounted from said member between the partially complete socket and the solid transverse wall, one wall of said gate completing the socket in the closed position of the gate, and a latch positionable between the gate and said solid transverse wall to hold the gate closed in a manner in which any force tending to open the gate is transmitted directly to said solid transverse wall.

WALTER E. CLAUS.